(12) United States Patent
Lahaeye

(10) Patent No.: US 10,015,939 B2
(45) Date of Patent: Jul. 10, 2018

(54) COMPACT PLANT GROWING UNIT

(71) Applicant: Eric Lahaeye, St-Joseph-du-Lac (CA)

(72) Inventor: Eric Lahaeye, St-Joseph-du-Lac (CA)

( * ) Notice: Subject to any disclaimer, the term of this patent is extended or adjusted under 35 U.S.C. 154(b) by 488 days.

(21) Appl. No.: 14/784,309

(22) PCT Filed: Apr. 16, 2014

(86) PCT No.: PCT/CA2014/000364
§ 371 (c)(1),
(2) Date: Oct. 14, 2015

(87) PCT Pub. No.: WO2015/157839
PCT Pub. Date: Oct. 22, 2015

(65) Prior Publication Data
US 2016/0198650 A1    Jul. 14, 2016

(30) Foreign Application Priority Data

Apr. 16, 2013   (GB) .................................... 1306905.9

(51) Int. Cl.
*A01G 31/02*    (2006.01)
*A01G 31/00*    (2018.01)

(52) U.S. Cl.
CPC ........ *A01G 31/02* (2013.01); *A01G 2031/006* (2013.01); *Y02P 60/216* (2015.11)

(58) Field of Classification Search
CPC .. A01G 31/02; A01G 2031/006; Y02P 60/216
USPC ................................................ 47/62 A, 62 R
See application file for complete search history.

(56) References Cited

U.S. PATENT DOCUMENTS

| | | | | | |
|---|---|---|---|---|---|
| 4,059,922 | A | * | 11/1977 | DiGiacinto | A01G 31/06 47/59 R |
| 4,218,847 | A | * | 8/1980 | Leroux | A01G 31/06 47/59 R |
| 4,869,019 | A | * | 9/1989 | Ehrlich | A01G 31/06 47/59 R |
| 5,265,376 | A | * | 11/1993 | Less | A01G 9/022 47/83 |

(Continued)

*Primary Examiner* — Ruth Ilan

(57) ABSTRACT

A compact plant growing unit has a body having an interior volume, a front portion, a top portion, a top panel, a bottom panel, and a basin portion extending outwardly from the bottom panel and the front portion and adapted to hold water therein. At least one opening in the front portion, wherein each of the opening includes a gutter member extending outwardly and upwardly from the front portion. A tube member placed within each of the opening and extending into the interior volume of the body. A water hose located within the interior volume of the body and extending between the basin portion and the top portion of the body, the water hose including at least one nozzle therethrough, wherein the water hose is adapted to allow water to pass from the basin portion, upwards and through the water hose, and outwards from the at least one nozzle opening, such that plants that are growing within each of the at least one tube member receive water that is ejected from the water hose. A pump member located within the interior volume of the body adapted to force water located within the basin portion upwards and through the water hose, and outwards from the at least one nozzle opening.

13 Claims, 5 Drawing Sheets

(56) References Cited

U.S. PATENT DOCUMENTS

| | | | | |
|---|---|---|---|---|
| 5,502,923 | A | * | 4/1996 | Bradshaw ............... A01G 31/06 47/62 A |
| 5,724,768 | A | * | 3/1998 | Ammann, Jr. ......... A01G 31/02 47/59 R |
| D638,743 | S | * | 5/2011 | Bouchard .................... D11/143 |
| 2006/0156624 | A1 | * | 7/2006 | Roy ....................... A01G 31/02 47/62 R |
| 2007/0144069 | A1 | * | 6/2007 | Gottlieb ................ A01G 9/023 47/82 |
| 2009/0190363 | A1 | * | 7/2009 | McDonnell ............ A01G 7/045 362/396 |
| 2013/0118074 | A1 | * | 5/2013 | Fulbrook ............... A01G 9/025 47/62 N |

* cited by examiner

COMPACT PLANT GROWING UNIT

FIELD OF THE INVENTION

The present invention relates generally to plant growing devices but more particularly to a compact plant growing unit.

BACKGROUND OF THE INVENTION

Home based agriculture is growing in popularity. Hydroponic systems are part of that trend. The problem is that some of those systems are quite large and take up a lot of room, which makes it difficult for people living in small housing to have them.

SUMMARY OF THE INVENTION

In view of the foregoing disadvantages inherent in the known devices now present in the prior art, the present invention, which will be described subsequently in greater detail, is to provide objects and advantages which are:

To provide for a compact plant growing system that has a very small footprint.

Another advantage is that the invention can be used for soil based agriculture.

Another advantage is that the invention can be used simply as a waterfall.

In order to do so, the invention comprises a body having an interior volume, a front portion, a top portion, a top panel, a bottom panel, and a basin portion forming part of the bottom of the body and extending outwardly from the bottom panel and the front portion and adapted to hold water therein. At least one opening in the front portion, wherein each of the opening includes a gutter member extending outwardly and upwardly from the front portion. A tube member placed within each of the opening and extending into the interior volume of the body. A water hose located within the interior volume of the body and extending between the basin portion and the top portion of the body, the water hose including at least one nozzle therethrough, wherein the water hose is adapted to allow water to pass from the basin portion, upwards and through the water hose, and outwards from the at least one nozzle opening, such that plants that are growing within each of the at least one tube member receive water that is ejected from the water hose. A pump member located within the interior volume of the body adapted to force water located within the basin portion upwards and through the water hose, and outwards from the at least one nozzle opening.

Preferably, the body is shaped forming a rectangular volume including a front panel, a back panel, and two opposite side panels.

The front panel and the two opposite side panels each include at least one of the opening, a tube member within each of the opening, and a gutter member upon each of the opening.

The front panel can include two the openings, each having a tube member within therein, and a gutter member thereupon, and wherein the two openings are placed in a vertical configuration.

The front panel includes four of the openings, and the two opposite side panels each include one of the openings, wherein all six of the openings include a tube member therethrough and a gutter member thereupon.

The hydroponic unit can be comprised of a light source adapted to promote plant growth.

The top panel of the body includes an opening for aeration.

The body further includes a back portion having a hole therethrough adapted to receive a wall fastener therein in order to hang the hydroponic unit on a wall.

The hydroponic unit is adapted to recirculate water that was ejected by the water hose, not used be the plants, and that drops back down into the basin portion.

The hydroponic unit has a water outlet to allow for water to circulate so as to prevent stagnation.

The hydroponic unit is further comprised of a tray member having a bottom surface and at least one side portion, and is adapted to be removably connected within the top portion of the body, the tray member having an opening through the at least one side portion; and a spout member located on the top portion of the body and passing therethrough, such that the spout member aligns with the opening of the tray member, and are adapted such that the tray member and the spout member can receive water from the water hose and allow it to fall down from the top portion of the body and into an extended portion of the basin to thereby create a waterfall effect.

A clear plastic cover member prevents water from a waterfall from splashing by having a collector member being angled downward so as to direct water into a water collecting opening leading into the basin portion.

The front portion is inclined relative to a vertical axis so as to reduce water splashing from said fountain assembly.

The light source is clipped on the rear of the top portion.

A lip member protects the clear plastic cover member against unintended damage by a user when removing the fountain assembly and reverting to a non-fountain assembly display.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figure 1:
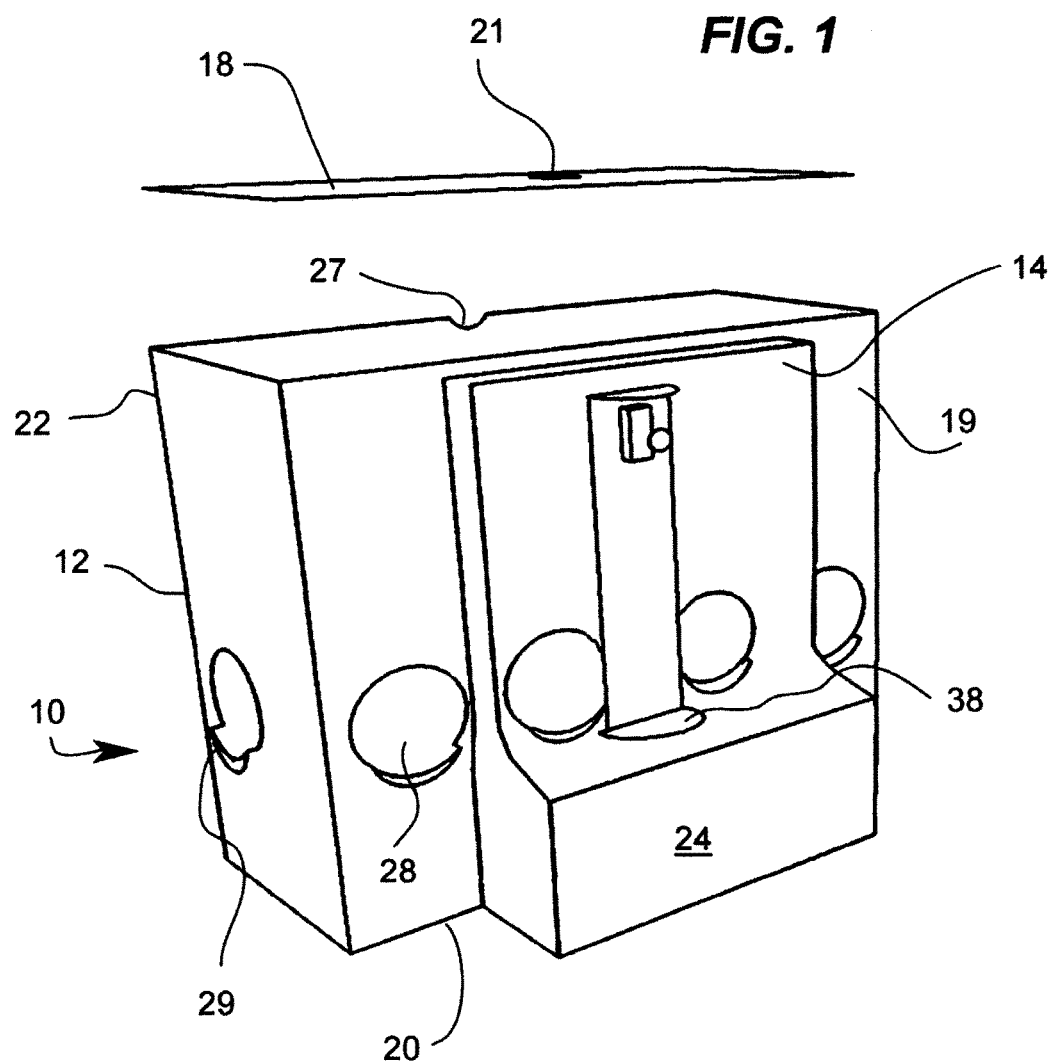
FIG. 1 Isometric view of the invention.
Figure 2:
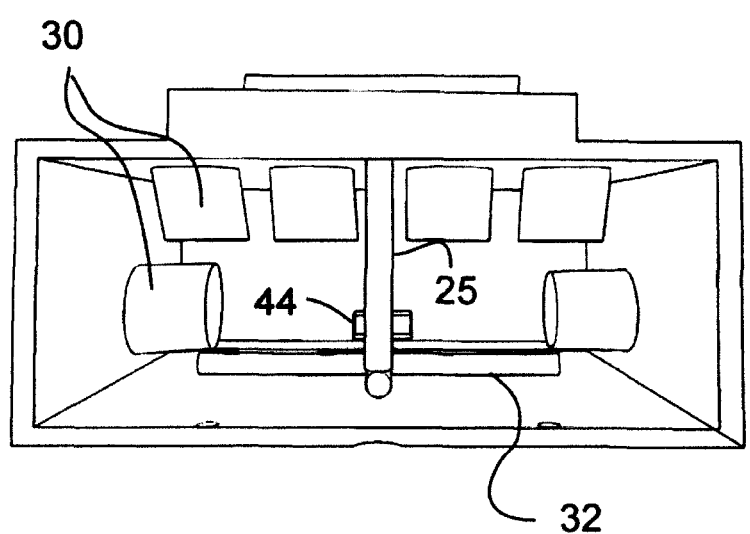
FIG. 2 Top view showing the interior of the body.
Figure 3:
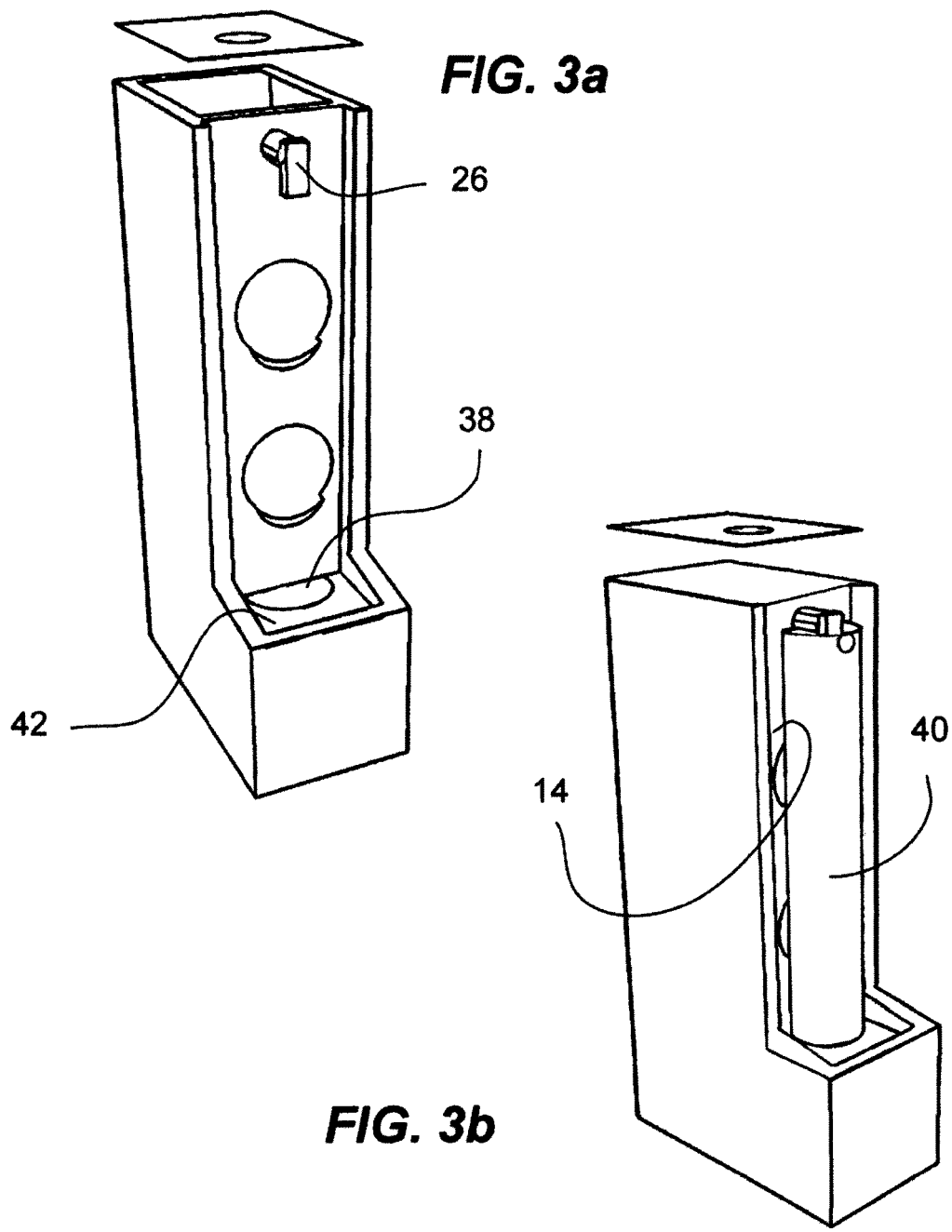
FIGS. 3a-b Isometric views of a small footprint model without and with the clear cover.
Figure 4:
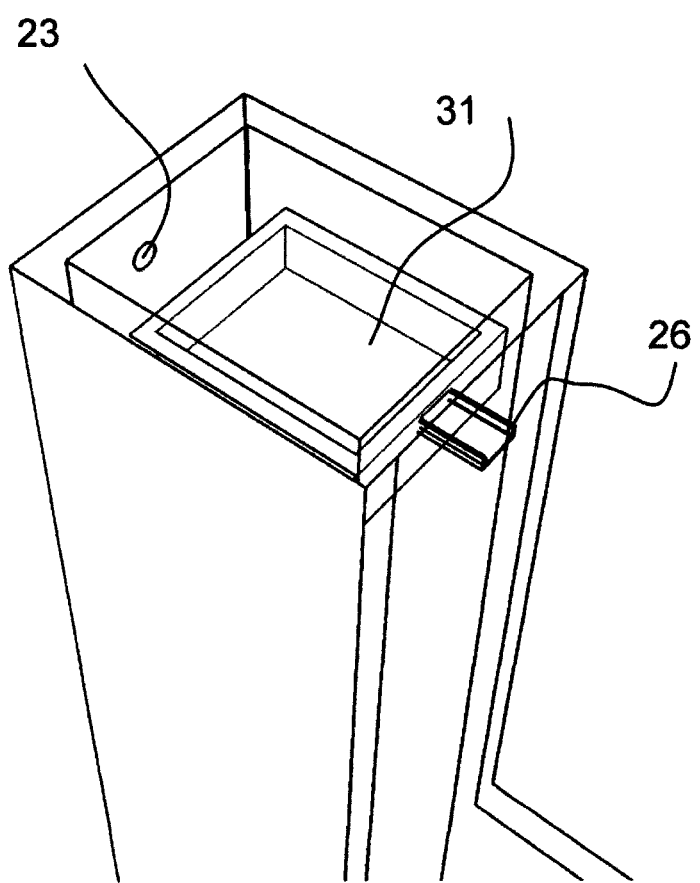
FIG. 4 Isometric view favoring the top and showing a tray holding water for the waterfall.
Figure 5:
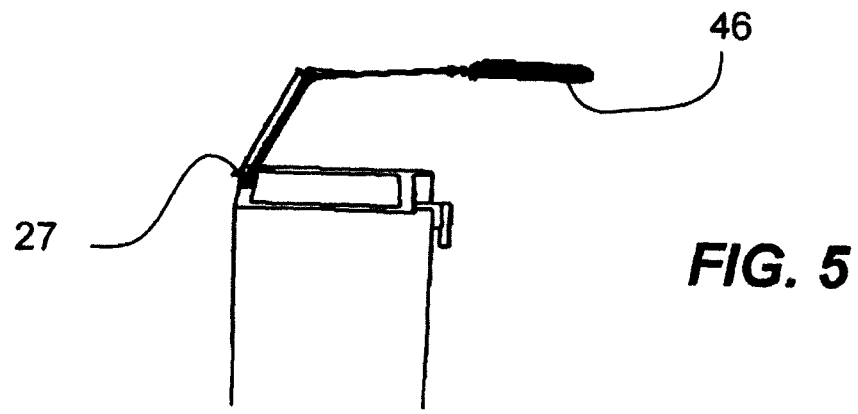
FIG. 5 Isometric view showing a light source clipped.
Figure 6:
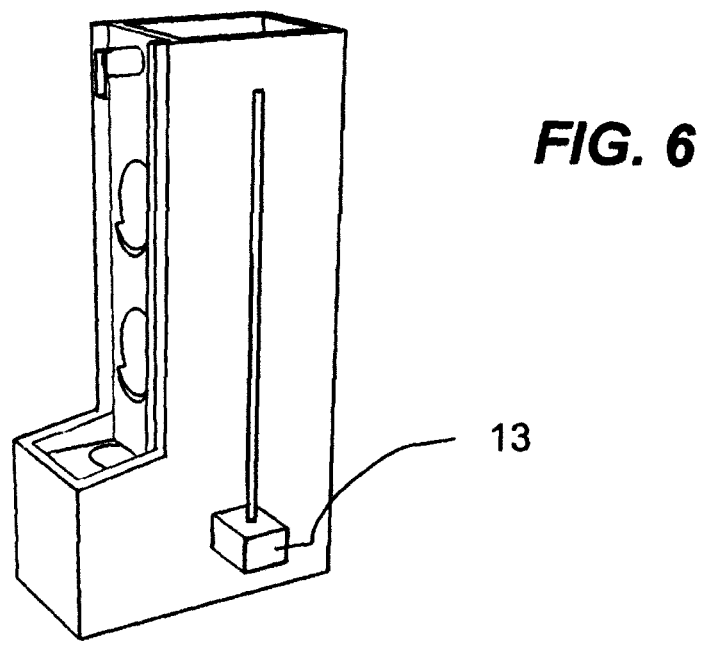
FIG. 6 See through isometric view showing the pump.

A compact hydroponic unit (10) has a body (12) having an interior volume defined by a front portion (14), two side panels (16), a top panel (18), a top portion (19), a bottom panel (20), and a back panel (22). The front portion (14) has a basin portion (24) to collect water from a waterfall (not shown) exiting from a spout member (26).

There are a plurality of openings (28) on the front portion (14) as well as the side panels (16) from which emerge plants (not shown). The openings are further comprised of gutters (29) to prevent dripping during watering. The protruding gutters (29) also help in holding mesh baskets (not shown) which are often used to hold plants and which are inserted inside tube members (30).

A water outlet (44) allows for water to circulate so as to prevent stagnation.

The openings (28) are the external part of the tube members (30) configured and sized to hold plants generally held with rock wool or such material usually used in hydroponics and aeroponics. The openings (28) are inclined so as to direct water inward.

In waterfall mode, a pump member (13) recirculates the water from the basin portion (24) through a water hose (25), into a tray member (31) and onto the spout member (26). A clear plastic cover member (40) prevents the water of the waterfall from splashing. The angle from a collector member (42) is going downward so as to direct water into a water collecting opening (38) leading into a basin portion (24). The front portion (14) can be inclined a few degrees off the vertical so as to reduce water splashing from the fountain assembly.

In hydroponic or aeroponic mode, the pump member (13) takes water from the basin portion (24) runs it through the water hose (25) and sprinkles it through nozzles (32). In soil mode, the watering is done manually.

Typically, the hydroponic unit (10) can be put on a kitchen counter but one or more holes (23) in the back panel (22) can be used if one wants to hang the hydroponic unit (10) on a wall.

The top panel (19) has an opening (21) to provide aeration for the interior of the body (12).

A light source (46) can be installed above or clipped at a clipping location (27).

A lip member (44) to protect the clear plastic cover member (40) otherwise it can be damaged when a user removes it in order to discontinue using the fountain assembly and revert to a non-fountain assembly display.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A compact hydroponic unit comprising a body having an interior volume, a front portion, a top portion, a top panel, a bottom panel, and a basin portion forming part of a bottom of said body and extending outwardly from said bottom panel and said front portion and adapted to hold water therein; at least one opening in said front portion, wherein each said opening includes a gutter member extending outwardly and upwardly from said front portion; a tube member placed within each said opening and extending into said interior volume of said body; a water hose located within said interior volume of said body and extending between said basin portion and said top portion of said body, said water hose including at least one nozzle therethrough, wherein said water hose is adapted to allow water to pass from said basin portion, upwards and through said water hose, and outwards from said at least one nozzle opening, such that plants that are growing within each of said at least one tube member receive water that is ejected from said water hose; and a pump member located within said interior volume of said body and adapted to force water located within said basin portion upwards and through said water hose, and outwards from said at least one nozzle opening; a fountain assembly comprising a tray member having a bottom surface and at least one side portion, and is adapted to be removably connected within said top portion of said body, said tray member having an opening through said at least one side portion; and a spout member located on said top portion of said body and passing therethrough, such that said spout member aligns with said opening of said tray member, and are adapted such that said tray member and said spout member can receive water from said water hose and allow it to fall down from said top portion of said body and into an extended portion of said basin to thereby create a waterfall effect.

2. The hydroponic unit of claim 1 wherein a clear plastic cover member prevents water from a waterfall from splashing by having a collector member being angled downward so as to direct water into a water collecting opening leading into the basin portion.

3. The hydroponic unit of claim 2 wherein the front portion is inclined relative to a vertical axis so as to reduce water splashing from said fountain assembly.

4. The hydroponic unit of claim 2 wherein a lip member protects said clear plastic cover member against unintended damage by a user when removing said fountain assembly and reverting to a non-fountain assembly display.

5. The hydroponic unit of claim 1 further comprising a light source adapted to promote plant growth within each of said at least one tube member, wherein said light source is dipped on the rear of said top portion.

6. The hydroponic unit of claim 1, wherein said body is shaped forming a rectangular volume including a front panel, a back panel, and two opposite side panels.

7. The hydroponic unit of claim 6, wherein said front panel and said two opposite side panels each include at least one said opening, a tube member within each said opening, and a protruding gutter member upon each said opening wherein said protrusion helps in holding mesh baskets used for holding plants inserted inside tube members, and wherein said at least one opening is inclined so as to direct water inward.

8. The hydroponic unit of claim 7, wherein said front panel includes four of said openings, and said two opposite side panels each include one of said openings, wherein all six of said openings include a tube member therethrough and a gutter member there upon.

9. The hydroponic unit of claim 6, wherein said front panel includes two said openings each having a tube member within therein, and a gutter member there upon; and wherein said two openings are placed in a vertical configuration.

10. The hydroponic unit of claim 1, wherein said top panel of said body includes an opening for aeration.

11. The hydroponic unit of claim 1, wherein said body further includes a back portion having a hole therethrough adapted to receive a wall fastener therein in order to hang said hydroponic unit on a wall.

12. The hydroponic unit of claim 1, wherein said hydroponic unit is adapted to recirculate water that was ejected by said water hose, not used by said plants, and that drops back down into said basin portion.

13. The hydroponic unit of claim 1, wherein a water outlet allows for water to circulate so as to prevent stagnation.

* * * * *